…

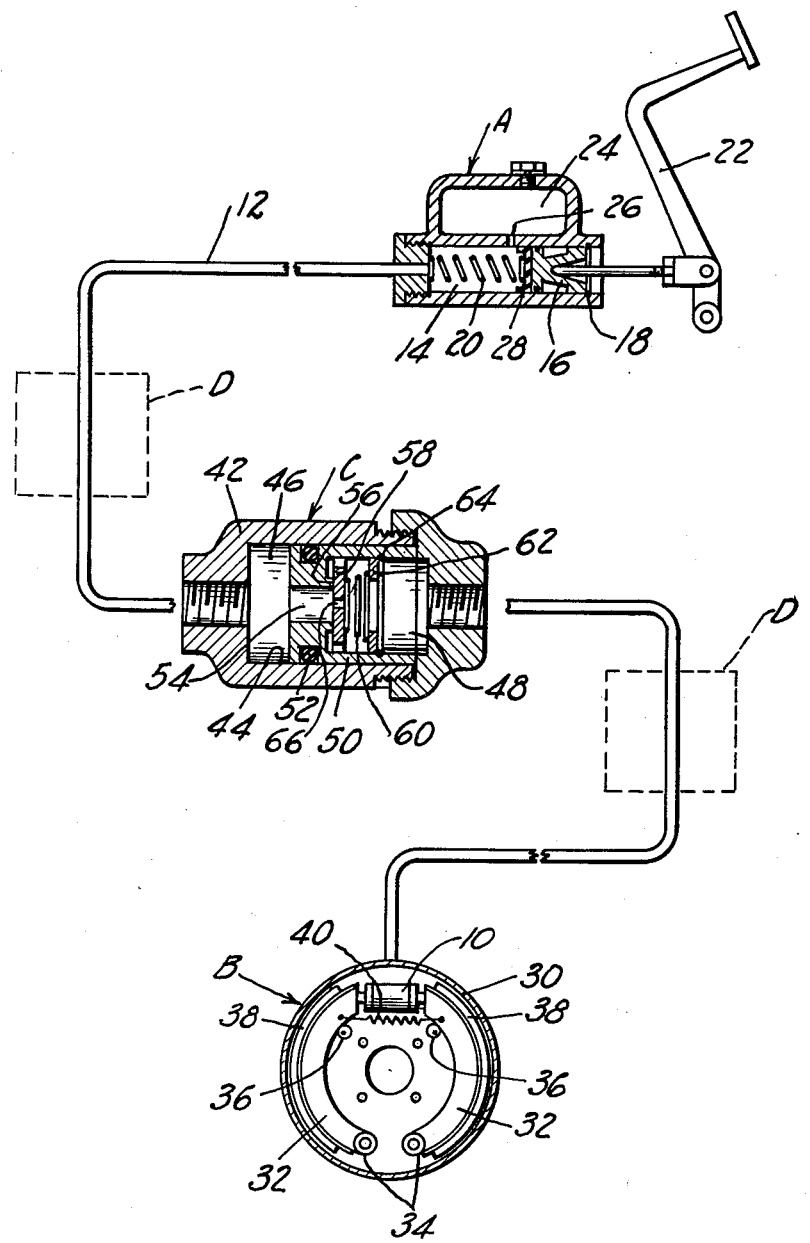

United States Patent Office 3,078,676
Patented Feb. 26, 1963

3,078,676
HYDRAULIC BRAKE PUMPING VALVE
John W. Blair, South Bend, Ind., assignor to The Bendix Corporation, South Bend, Ind., a corporation of Delaware
Filed Aug. 17, 1961, Ser. No. 132,154
2 Claims. (Cl. 60—54.5)

The present invention relates to hydraulic systems having a pumping device which actuates a driven fluid pressure motor; and more particularly to automotive braking systems which are actuated by master cylinders.

Conventional master cylinders used to actuate present day automotive braking systems generally comprise a fluid pressurizing chamber from which fluid is displaced by means of a movable wall or piston. These master cylinders also contain a reservoir of low pressure compensating fluid which is communicated to the fluid pressurizing chamber when the master cylinder's piston is in its normal retracted position, and which is closed off from the pressurizing chamber when the piston is moved to displace fluid from the master cylinder. The amount of fluid or displacement required by the brake applying wheel cylinders is normally determined by the movement required to move the brake shoes from their return stops into engagement with their brake drums. This movement increases as brake lining wear occurs so that greater and greater amounts of displacement are required by the master cylinder during wear of the brake lining, until the return stops are readjusted to reduce their movement away from the brake drums. The amount of fluid displacement required by the wheel cylinders in order to actuate the brakes may further increase during a long and severe brake application wherein the brake drum expands outwardly away from the shoes.

The master cylinder pistons are conventionally operated by foot pedal levers and the art has long desired to reduce the travel of these levers to that generally corresponding with that of the conventional accelerator pedal. It has not been possible heretofore to completely accomplish this desired reduction in brake pedal lever movement; inasmuch as it has been necessary heretofore to provide a master cylinder having a displacement larger than the normal requirement of the wheel cylinders—so that during a severe brake application when the brakes are in an unadjusted condition sufficient displacement will exist to apply the brakes with a single stroke of the master cylinder. It has been possible heretofore in conventional master cylinders to permit the brake pedal lever to completely retract and a small additional amount of fluid from the reservoir drawn into the braking system so that upon a reapplication of the brakes this small additional amount of fluid will be delivered to the wheel cylinders. This has been so unreliable, heretofore, that it has not been generally considered practical to reduce the displacement of conventional master cylinders to a point where a reapplication of the brake pedal lever can be relied upon to provide the additional displacement required during an emergency. This release and reapplication of the brake pedal lever is conventionally called pumping of the master cylinder.

An object of the present invention is the provision of a new and improved hydraulic automotive braking system of high pumping efficiency wherein the master cylinder is normally provided with a displacement sufficient to take care of a normal brake application and which is reliable enough that a reapplication of the brake pedal lever can be depended upon to provide adequate braking during emergencies.

Another object of the present invention is the provision of a new and improved braking system of the above mentioned type wherein the system has a high pumping efficiency.

A more particular object of the present invention is the provision of a new and improved braking system of the above mentioned type having means which allows a substantially unrestricted return flow from the wheel cylinders in an amount just sufficient to release the brake shoes from the brake drums and thereafter restrict return flow to a point where the balance of the displacement of the master cylinder is taken up by a fresh supply of fluid from its reservoir; and so that a subsequent restroking of the master cylinder will force this additional supply of fluid to the wheel cylinders.

A still further object of the present invention is the provision of a new and improved flow restricting device which will permit flow in one direction with very little pressure restriction, but which will permit a predetermined return flow at a small pressure differential in the opposite direction and thereafter greatly restricts the return flow.

The invention resides in certain constructions and combinations and arrangements of parts; and further objects and advantages of the invention will become apparent to those skilled in the art to which it relates from the following description of the preferred embodiment described with reference to the accompanying drawing; in which:

The solitary FIGURE is a somewhat schematic view of an automotive braking system wherein a flow restricting device is shown in cross section.

The automotive braking system shown in the drawing generally comprises a conventional master cylinder A whose discharge is connected to the wheel cylinder 10 of a conventional drum and shoe type brake B by the usual interconnecting hydraulic line 12. The system further includes a return flow restricting device C which restricts return flow from the wheel cylinders 10 to the master cylinder A in a manner later to be explained. The system may further include a fluid pressure intensifying unit of the type shown in the Hupp et al. application Serial No. 841,662 in either of the dotted locations D or D'.

The master cylinder A of course includes a fluid pressurizing chamber 14 from which fluid is displaced into the line 12 by means of its movable wall or hydraulic piston 16. The piston 16 is normally held in engagement with its return stop 18 by means of the piston return spring 20, and the piston 16 is adapted to be moved out of its normal position to displace fluid from the chamber 14 by means of a conventional foot pedal lever 22. The master cylinder further includes a reservoir 24 of low pressure hydraulic fluid which is communicated to the pressurizing chamber 14 by means of a compensating passage 26 which is located just forwardly of the normal retracted position of the piston 16. Upon actuation of the foot pedal lever 22, the piston seal 28 is slid past the compensating port 26 to close it off and thereafter force fluid out into the interconnecting line 12.

The brake shown in the drawing comprises a drum 30 inside of which is located two shoes 32 which are forced outwardly into engagement with the drum by means of the wheel cylinder 10. The brake B may be of any suitable type and as shown in the drawing is of the type wherein the shoes 32 are pivoted to their backing member or support adjacent their lower edge 34 and are forced outwardly at the top by means of the wheel cylinder 10. The brake further includes the usual eccentric return stops 36 which engage the shoes 32 and normally limit their movement away from the brake drum 30. The amount of fluid required by the brake motor 10 therefore is normally that required to move the brake shoes from the return stops 36 into engagement with the drum 30. This movement of course increases with wear of the brake lining 38 and with other conditions as will be well understood by the art. The brake shoes 32 are biased into their retracted positions against the stops 36 by means of a strong shoe return spring 40 which forces fluid out of the wheel cylinder 10 to the master cylinder A.

According to principles of the present invention a return flow restricting device C is provided between the wheel cylinders 10 and the master cylinder A which will permit an initial rapid return of the fluid and thereafter greatly restrict this return flow. During the usual brake application a considerable amount of displacement from the master cylinder is required to move the shoes out into engagement with the drums, and this is done at a hydraulic pressure which does not generally exceed approximately 100 p.s.i. Thereafter the master cylinder A is called upon to produce a small additional fluid flow at a greatly increased pressure to produce the actual frictional force between the brake shoes and drums. The amount of this additional fluid required after the shoes engage their drums may be thought of as a second stage of fluid flow and is brought about by reason of the deflection of the shoes, expansion of the hydraulic interconnecting line 12 due to pressure, and the deformation of the brake drums 30. According to principles of the present invention, the flow restricting device C is sized to permit a return flow which generally equals the second stage of fluid flow, and which is brought about by reason of the deflection or deformation of the hydraulic and braking systems. Thereafter the device C greatly restricts the return flow so that an amount of fluid equal to the balance of the original displacement of the piston 16 will be caused to flow through the compensating port into the chamber 14 when the piston 16 is permitted to assume its fully retracted position shown in the drawing. Thereafter a reapplication of the brake pedal lever 22 forces this additional amount of fluid to the wheel cylinders 10.

The flow restricting device C shown in the drawing generally comprises a housing 42 having an internal hydraulic chamber 44 therein which is divided into opposing inlet and outlet chambers 46 and 48 by means of a movable wall or hydraulic piston 50. The piston is provided with a suitable O-ring seal 52 and the chamber 46 is so designed that the piston 50 will have a movement or displacement that is limited by engagement of the piston with the opposite end walls of the chamber 44. The piston 50 is provided with a centrally located opening 54 therethrough which has a valve seat or shoulder 56 which faces the outlet chamber 48. A poppet member 58 is provided for abutment with the valve seat 56, and the poppet is biased against the seat 56 by means of a coil spring 60. The coil spring is held against the poppet member 58 by means of a washer 62 and snap ring 64. The flow restricting device C further includes a small orifice or flow restricting port 66 through the poppet member 58 for reasons which will later be explained.

During normal operation the system shown in the drawing, depression of the foot pedal lever 22 causes the seal 28 to move past the compensating port 26 to thereafter force fluid out of the hydraulic pressurizing chamber 14 into the interconnecting lines 12. The master cylinder A is connected to the inlet opposing chamber 46 of the flow restricting device C to cause the piston 50 to move into engagement with the right hand end wall of the hydraulic chamber 44. Movement of the piston 50 of course displaces fluid to the wheel cylinders 10; and after the piston 50 has engaged its right hand end wall of the chamber 44 further flow passes through the opening 54 of the piston 50 to force the poppet member 58 off of its seat. Flow from the master cylinder A continues therefore to the wheel cylinders 10 until the brake shoes 32 are forced out into engagement with the brake drums 30. Sufficient force is applied to the brake pedal lever 22 to provide sufficient frictional engagement between the brake lining 38 and the brake drums 30 to provide the desired vehicle braking effort.

If for some reason the brake pedal lever 22 has been moved to its full limit of travel to engage the floor boards before sufficient fluid has been forced into the wheel cylinders 10 to provide the desired braking application, the master cylinder A can be pumped by removing all force from the foot pedal lever 22. Thereupon pressure in the wheel cylinders 10 causes fluid to flow back through the lines 12 to the flow restricting device C to cause its piston 50 to immediately move its opposite end wall and force fluid out of its inlet chamber 46. As previously mentioned the chamber 46 has been sized to provide a displacement which just equals that required to permit the brake lining 38 to begin to separate from the brake drums 30. Thereafter the only flow which can take place through the flow restricting device C is that which can pass through the small flow restricting orifice 66 in the poppet member 58. The volume of the inlet chamber 46 will only be a small fraction of the fluid pressurizing chamber 14 of the master cylinder A, so that after the piston 16 has moved back by an amount equalling this displacement, a vacuum will be created in the pressurizing chamber 14 which will permit fluid from the compensating port 26 to flow around the piston seal 28 to the chamber 14. An amount of fluid is taken into the chamber 14 therefore which generally equals the original displacement of the chamber 14 minus the displacement of the input chamber 46. A quick reapplication of the lever 22 therefore forces the fluid which has been newly added to the pressurizing chamber 14 to the flow restricting device C. This flow moves the piston 50 to the right following which the poppet member 58 moves off of the seat 56 to provide the additional displacement required in the wheel cylinders 10 to completely actuate the brake B. Whenever it is desired to release the brakes, removal of force from the lever 22 permits pressure in the wheel cylinder 10 to move the piston 50 to its limited travel against the left hand wall of the chamber 44, at which time substantially no further braking effort or force is produced between the line 38 and drum 30. Thereafter a complete release of the brakes is had by slow movement of fluid through the orifice 66 to permit the shoes to return to their stops 36. One flow restricting device may be used with each wheel cylinder or in some instances flow restricting device may be used for a plurality of wheel cylinders.

It will be apparent that the objects heretofore enumerated as well as others have been accomplished; that there has been provided a valve structure for automotive hydraulic braking systems which will permit a quick return flow from the wheel cylinders in an amount which just permits the brake shoes to start to move out of engagement with the brake drums, and thereafter greatly restricts flow so that further retraction of the hydraulic piston of the master cylinder draws a new supply of fluid into its pressurizing chamber.

While the invention has been described in considerable detail, I do not wish to be limited to the particular construction shown and described and it is my intention to cover hereby all novel adaptations, modifications and arrangements thereof which come within the practice of those skilled in the art to which the invention relates.

I claim:

1. In a hydraulic braking system and the like: at least one brake structure having first and second friction producing members which are rotated relative to each other and a brake actuating hydraulic fluid pressure motor for moving said first and second members together, each brake structure requiring a predetermined brake releasing displacement of its fluid pressure motor to just allow separation of said first and second friction producing members, a hydraulic fluid pressurizing chamber including a movable wall, said movable wall having a normal position from which it is moved to force fluid from said pressurizing chamber, a reservoir of compensating fluid for said pressurizing chamber, compensating means which communicates said reservoir to said fluid pressurizing chamber when said movable wall is in its normal position and which closes off said fluid pressurizing chamber from said reservoir when said movable wall is moved to force fluid out of said chamber, a second fluid pressure chamber having a second movable wall dividing said second chamber into opposing inlet and outlet chambers, stop means limiting movement of said second movable wall from a collapsed condition of said inlet chamber to a collapsed condition of said outlet chamber and vice versa to provide a predetermined displacement in each direction, said inlet chamber being communicated to said pressurizing chamber and said outlet chamber being communicated to said hydraulic fluid pressure motors of each brake structure and said predetermined displacement of said inlet and outlet chambers being generally equal to the sum of said predetermined brake releasing displacements of said brake structures communicating with said outlet chamber, said second movable wall being movable from a collapsed condition of said inlet chamber to a collapsed condition of said outlet chamber with a small predetermined pressure differential, a normally closed back pressure valve which opens at a pressure above said predetermined pressure differential to communicate said inlet chamber to said outlet chamber, and means permitting small compensating flows between said outlet and inlet chambers at pressure differentials below said predetermined differential, whereby return flow from said brake actuating motor is restricted when said compensating means is opened to permit flow into said pressurizing chamber from said reservoir.

2. In a hydraulic braking system and the like: at least one brake structure having first and second friction producing members which are rotated relative to each other and a brake actuating hydraulic fluid pressure motor for moving said first and second members together, each brake structure requiring a predetermined brake releasing displacement of its fluid pressure motor to just allow separation of said first and second friction producing members, a hydraulic fluid pressurizing chamber including a movable wall, said movable wall having a normal position from which it is moved to force fluid from said pressurizing chamber, a reservoir of compensating fluid for said pressurizing chamber, compensating means which communicates said reservoir to said fluid pressurizing chamber when said movable wall is in its normal position and which closes off said fluid pressurizing chamber from said reservoir when said movable wall is moved to force fluid out of said chamber, a second fluid pressure chamber having a second movable wall dividing said second chamber into opposing inlet and outlet chambers, stop means limiting movement of said second movable wall from a collapsed condition of said inlet chamber to a collapsed condition of said outlet chamber and vice versa to provide a predetermined displacement in each direction, said inlet chamber being communicated to said pressurizing chamber and said outlet chamber being communicated to said hydraulic fluid pressure motors of each brake structure and said predetermined displacement of said inlet and outlet chambers being generally equal to the sum of said predetermined brake releasing displacements of said brake structures communicating with said outlet chamber, said second movable wall being movable from a collapsed condition of said inlet chamber to a collapsed condition of said outlet chamber with a small predetermined pressure differential, said second movable wall having a flow passage therethrough, a valve seat surrounding said flow passage and facing said outlet chamber, and a valve closure member spring biased toward said valve seat, said valve closure member including a small flow restricting orifice therethrough, whereby return flow from said brake actuating motor is restricted when said compensating means is opened to permit flow into said pressurizing chamber from said reservoir.

References Cited in the file of this patent
UNITED STATES PATENTS

| | | |
|---|---|---|
| 1,569,143 | Robinson | Jan. 12, 1926 |
| 2,249,286 | Dudley | July 15, 1941 |
| 2,282,333 | Masteller | May 12, 1942 |